US010188950B2

(12) United States Patent
Biswas et al.

(10) Patent No.: US 10,188,950 B2
(45) Date of Patent: Jan. 29, 2019

(54) METHOD AND APPARATUS FOR PROVIDING PRIVACY POLICY GENERATION BASED ON IN-GAME BEHAVIOR DATA

(71) Applicant: Nokia Technologies Oy, Espoo (FI)

(72) Inventors: Debmalya Biswas, Lausanne (CH); Julian Nolan, Pully (CH); Matthew John Lawrenson, Bussigny-pres-de-lausanne (CH)

(73) Assignee: Nokia Technologies Oy, Espoo (FI)

( * ) Notice: Subject to any disclaimer, the term of this patent is extended or adjusted under 35 U.S.C. 154(b) by 1087 days.

(21) Appl. No.: 14/521,655

(22) Filed: Oct. 23, 2014

(65) Prior Publication Data

US 2016/0114247 A1    Apr. 28, 2016

(51) Int. Cl.
| A63F 9/00 | (2006.01) |
| A63F 13/55 | (2014.01) |
| G06F 21/62 | (2013.01) |
| A63F 13/216 | (2014.01) |
| A63F 13/75 | (2014.01) |

(52) U.S. Cl.
CPC ............ *A63F 13/55* (2014.09); *A63F 13/216* (2014.09); *A63F 13/75* (2014.09); *G06F 21/6245* (2013.01); *G06F 2221/2109* (2013.01); *G06F 2221/2111* (2013.01)

(58) Field of Classification Search
CPC .......................... A63F 13/216; A63F 2300/205
See application file for complete search history.

(56) References Cited

U.S. PATENT DOCUMENTS

| 9,311,496 B1* | 4/2016 | Dutch ................... G06F 21/604 |
| 2003/0036428 A1* | 2/2003 | Aasland .................. A63F 13/12 |
| | | 463/29 |

(Continued)

FOREIGN PATENT DOCUMENTS

WO    2007010336 A1    1/2007

OTHER PUBLICATIONS

L. Jedrzejczyk et al., "On the Impact of Real-Time Feedback on Users' Behaviour in Mobile Location-Sharing Applications," Symposium on Usable Privacy and Security (SOUPS) 2010, Redmond, WA, USA, Jul. 14-16, 2010, 12 pages.

(Continued)

*Primary Examiner* — Seng Heng Lim
(74) *Attorney, Agent, or Firm* — Ditthavong & Steiner, P.C.

(57) ABSTRACT

An approach is provided of generating real-world privacy policies based on in-game behavior. A privacy policy platform determines in-game behavior data associated with at least one user while the at least one user is playing at least one location-based game. The privacy platform causes, at least in part, a mapping of the in-game behavior data to one or more game locations within the at least one location-based game. The privacy platform further causes, at least in part, a correlation of the one or more game locations to one or more real-world locations. The privacy platform then causes, at least in part, a generating of one or more privacy policies for the one or more real-world locations based, at least in part, on the in-game behavior data mapped to the correlated one or more game locations.

20 Claims, 10 Drawing Sheets

(56) References Cited

U.S. PATENT DOCUMENTS

| | | | |
|---|---|---|---|
| 2006/0128397 A1* | 6/2006 | Choti | G06Q 10/0875 455/456.1 |
| 2006/0270421 A1 | 11/2006 | Phillips et al. | |
| 2007/0021166 A1 | 1/2007 | Mattila | |
| 2007/0232396 A1* | 10/2007 | Yoo | G07F 17/32 463/42 |
| 2007/0260567 A1* | 11/2007 | Funge | A63F 13/10 706/47 |
| 2010/0076274 A1* | 3/2010 | Severson | A61B 5/16 600/300 |
| 2010/0077484 A1* | 3/2010 | Paretti | H04W 4/21 726/26 |
| 2010/0304804 A1 | 12/2010 | Spivack | |
| 2011/0269547 A1* | 11/2011 | Harris | A63F 13/12 463/42 |
| 2012/0100869 A1 | 4/2012 | Liang et al. | |
| 2012/0149449 A1* | 6/2012 | Choi | A63F 13/31 463/1 |
| 2013/0044128 A1* | 2/2013 | Liu | G09G 5/00 345/633 |
| 2013/0085861 A1* | 4/2013 | Dunlap | G01S 19/34 705/14.58 |
| 2013/0102394 A1* | 4/2013 | Seitz | G07F 17/3225 463/42 |
| 2013/0174213 A1* | 7/2013 | Liu | G02B 27/017 726/1 |
| 2013/0185804 A1 | 7/2013 | Biswas et al. | |
| 2013/0232552 A1 | 9/2013 | Brush et al. | |
| 2013/0260846 A1 | 10/2013 | Kruglick | |
| 2013/0263206 A1 | 10/2013 | Nefedov et al. | |
| 2013/0310156 A1* | 11/2013 | Gadher | G07F 17/3225 463/25 |
| 2014/0006129 A1* | 1/2014 | Heath | G06Q 30/0222 705/14.23 |
| 2014/0059695 A1* | 2/2014 | Parecki | G06F 21/60 726/26 |
| 2014/0329589 A1* | 11/2014 | Hawver | A63F 13/42 463/29 |
| 2015/0074746 A1* | 3/2015 | Kohno | H04L 63/0823 726/1 |
| 2015/0199523 A1* | 7/2015 | Hamilton | G06F 21/60 726/27 |
| 2016/0063597 A1* | 3/2016 | Goulart | G06Q 30/0631 705/26.7 |
| 2016/0354683 A1* | 12/2016 | Palmisano | A63F 13/46 |

OTHER PUBLICATIONS

G. Myles et al., "Preserving Privacy in Environments with Location-Based Applications," IEEE Pervasive Computing, IEEE CS and IEEE Communications Society, Issue 1, vol. 2, Jan. 2003, 16 pages.

Notification of Transmittal of the International Search Report and the Written Opinion of the International Searching Authority, or the Declaration; International Search Report and Written Opinion of the International Searching Authority for corresponding International Patent Application No. PCT/FI2015/050687, dated Feb. 16, 2016, 13 pages.

Wikipedia, "Software Agent" Oct. 14, 2014, retrieved from Internet, https://en.wikipedia.org/wiki/index/php?title=Software_agent&oldid=629564853, pp. 1-8.

Office Action for corresponding European Patent Application No. 15852473.6-1210, dated Mar. 27, 2018, 14 pages.

Greene, "TRIO: Reality Mining", MIT Technology Review, Feb. 19, 2008, retrieved on Mar. 23, 2018 from http://www2.technologyreview.com/news/409598/tr10-reality-mining/, 2 pages.

Chen et al., "Mining User Movement Behavior Patterns in a Mobile Service Environment", IEEE Transactions on Systems, Man, and Cybernetics—Part A: Systems and Humans, vol. 42 Issue: 1, Jan. 2012, pp. 87-101.

Castelluccia, "Behavioural Tracking on the Internet: A Technical Perspective", Chapter from book European Data Protection: In Good Health? Jan. 1, 2012, pp. 21-33.

Duckham et al., "3 Location privacy and location-aware computing", Dec. 1, 2005 pp. 1-20.

Office Action for corresponding Japanese Patent Application No. 2017-521982, dated Jun. 6, 2018, 8 pages, English Language Summary Included.

* cited by examiner

METHOD AND APPARATUS FOR PROVIDING PRIVACY POLICY GENERATION BASED ON IN-GAME BEHAVIOR DATA

BACKGROUND

Recent advances in mapping and gaming technologies have led to compelling multi-player location-based games that model real-world environments. Players of such location-based games have been found to exhibit a connection with in-game locations with which they have an existing relationship in real-life (e.g., home, office, favorite restaurants, and/or other points of interest).

At the same time, within an increasingly connected communications environment, players and users in general are increasingly concerned with ensuring the privacy of their data and/or other interactions with their network devices and services. In particular, many users are concerned with the issue of location-based privacy (e.g., how to determine the users/devices with whom a user's device is allowed to connect, share with, etc.) and how to generate location-based privacy policies as little burden as possible on the users.

Accordingly, service providers and device manufacturers face significant technical challenges to facilitating automated location-based privacy policy generation using existing data already available about users (e.g., in-game behavior data collected from location-based games).

SOME EXAMPLE EMBODIMENTS

Therefore, there is a need for an approach for providing privacy policy generation based on in-game behavior data.

According to one embodiment, a method comprises determining in-game behavior data associated with at least one user while the at least one user is playing at least one location-based game. The method also comprises causing, at least in part, a mapping of the in-game behavior data to one or more game locations within the at least one location-based game. The method further comprises causing, at least in part, a correlation of the one or more game locations to one or more real-world locations. The method further comprises causing, at least in part, a generating of one or more privacy policies for the one or more real-world locations based, at least in part, on the in-game behavior data mapped to the correlated one or more game locations.

According to another embodiment, an apparatus comprises at least one processor, and at least one memory including computer program code for one or more computer programs, the at least one memory and the computer program code configured to, with the at least one processor, cause, at least in part, the apparatus to determine in-game behavior data associated with at least one user while the at least one user is playing at least one location-based game. The apparatus also causes, at least in part, a mapping of the in-game behavior data to one or more game locations within the at least one location-based game. The apparatus further causes, at least in part, a correlation of the one or more game locations to one or more real-world locations. The apparatus further causes, at least in part, a generating of one or more privacy policies for the one or more real-world locations based, at least in part, on the in-game behavior data mapped to the correlated one or more game locations.

According to another embodiment, a computer-readable storage medium carries one or more sequences of one or more instructions which, when executed by one or more processors, cause, at least in part, an apparatus to determine in-game behavior data associated with at least one user while the at least one user is playing at least one location-based game. The apparatus also causes, at least in part, a mapping of the in-game behavior data to one or more game locations within the at least one location-based game. The apparatus further causes, at least in part, a correlation of the one or more game locations to one or more real-world locations. The apparatus further causes, at least in part, a generating of one or more privacy policies for the one or more real-world locations based, at least in part, on the in-game behavior data mapped to the correlated one or more game locations.

According to another embodiment, an apparatus comprises means for determining in-game behavior data associated with at least one user while the at least one user is playing at least one location-based game. The apparatus also comprises means for causing, at least in part, a mapping of the in-game behavior data to one or more game locations within the at least one location-based game. The apparatus further comprises means for causing, at least in part, a correlation of the one or more game locations to one or more real-world locations. The apparatus further comprises means for causing, at least in part, a generating of one or more privacy policies for the one or more real-world locations based, at least in part, on the in-game behavior data mapped to the correlated one or more game locations.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing privacy policy generation based on in-game behavior data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the various embodiments discussed herein refer to generating privacy policies, it is contemplated that the approaches presented in the embodiments are also applicable to any type of policy (e.g., security policy, access policies, etc.) that can be applied to a user device. Moreover, although the policies described herein are discussed as location-based policies (e.g., polices associated with specific locations such as in-game and/or real-world locations), it is contemplated that the approaches presented in the embodiments are also applicable to policies based on other contextual parameters (e.g., by contact, by activity, by time, etc.).

Figure 1:
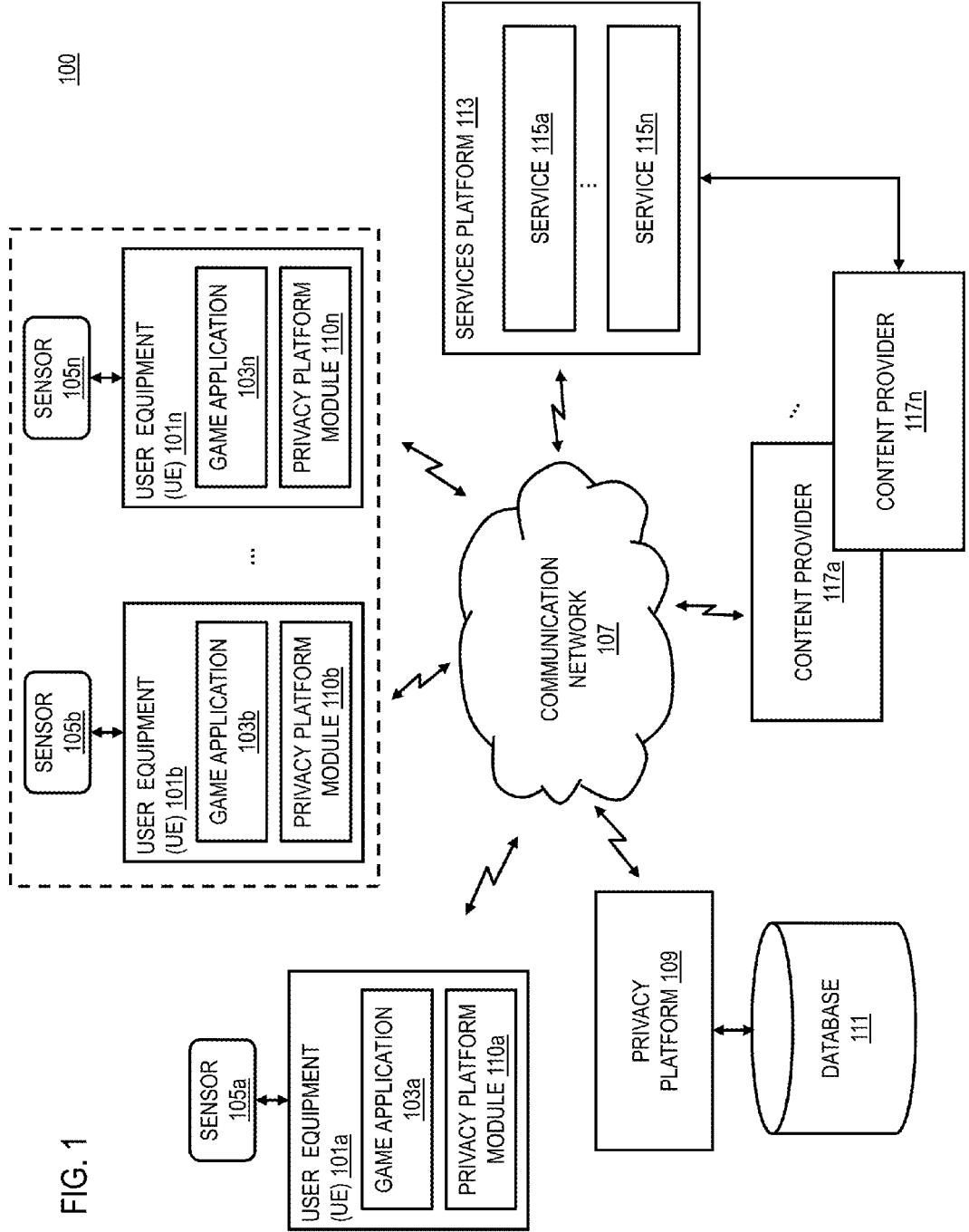
FIG. 1 is a diagram of a system capable of providing privacy policy generation based on in-game behavior data, according to one embodiment.

FIG. 1 is a diagram of a system capable of providing privacy policy generation based on in-game behavior data, according to one embodiment. Traditionally, the process for generating privacy policies can be very time and/or effort consuming. For example, with respect to location-based privacy policies, traditional policy processes generally consist of a user manually setting privacy policies for each location, for each type of action, for each contact, etc., one by one. However, this is a potentially burdensome process which many users are unwilling to unwilling to undertake. As a result, users tend to avoid such generating such policies, with the end result being that only simplified "All-or-Nothing" types of policies get used practice. Instances of such "All-or-Nothing" policies include settings in current mobile platforms where location-based services are either enabled for an application or not, without the ability to specify specific locations where the location-based services are enabled and where they are not.

To address this problem, a system 100 of FIG. 1A introduces a capability to automate the generation of location oriented policies by "learning" from user behavior data collected while playing location-based games. In one embodiment, the system 100 tracks a user's behavior and actions at particular in-game locations while playing a location-based game. By way of example, location-based games include any type of game, application, and/or service that enables a user to interact with other players (or their virtual counterparts) at one or more in-game locations that can be correlated to real-world locations. Based on this in-game behavior data, the system 100 generates privacy policies specific to real-world locations that correspond to the in-game locations.

In one embodiment, location-oriented privacy policies control, for instance, what data users share with applications via their devices, which activities the devices perform, how the devices interact with other users, etc. In other words, these privacy policies can restrict or permit access to various device functions such as: accessing one or more sensors (e.g., a camera sensor, a location sensor, a microphone, etc.); sharing location information at specific locations (e.g., locations determined to be "sensitive" to a user); device pairing at specific locations; etc. For example, one sample policy can be of the form: "Do not allow application A to turn on the device camera when the user U is in a sensitive location L."

By way of example, sample use-cases for how the system 100 can transform a user's in-game behavior data (e.g., collected from a location-based game) to location-based privacy policies are as follows:

(1) User U spends time>t at location L in a game. This observation is used to infer that in-game location L is a "sensitive" location for user U, and a privacy policy is defined to switch off all location sharing activities on user U's device whenever the user U or the device is at the real-world equivalent of location L.

(2) User U always engages in activity X at location L in the game. This observation is used to define a privacy policy that allows sensors and/or data corresponding to activity X to be shared, while restricting access to all other sensors and/or data by applications on user U's device, whenever user U is at the real-world equivalent of location L.

(3) User U avoids player P at location L in the game, but interacts with player P at location L'. This observation is used to define a privacy policy for user U that restricts user U's device from pairing with player P's device at the real-world equivalent of location L, but allows user U's device to pair with player P's device at the real-world equivalent of location L'.

As shown in FIG. 1, in one embodiment, the system 100 includes user equipment (UE) 101a (e.g., a mobile device) that can potentially interact with any number of other user equipment 101b-101n. UEs 101a and 101b-101n are also collectively referred to as UEs 101. In one embodiment, the UEs 101a-101n may execute one or more game applications 103a-103n (also collectively referred to as game applications 103). By way of example, the game applications 103 may include location-based games that enable players to interact with in-game locations that can be correlated to or otherwise represent real-world locations. In some example game applications 103, the in-game locations may also be the actual real-world locations (e.g., in augmented reality location-based games). In another embodiment, the game applications 103 enable players to interact with other players within the game environment. For example, a player playing the game application 103a on the UE 101a may interact with other players playing game applications 103a-103n on the respective UEs 101b-101n. In one embodiment, the game applications 103 can be configured to collect or otherwise generate game behavior data that represents user actions within the game environment as well as contextual information about the user's gameplay (e.g., location, time, duration, etc.).

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the UEs 101a-101n are configured with one or more sensors 105a-105n that can generate data used during gameplay, data used for generating privacy policies, data that is subject to the privacy policies of the UEs 101, or a combination thereof. By way of example, the sensors 105 may be any type of sensors. In certain embodiments, the sensors 105 may include, for example, a global positioning sensor for gathering location data, a network detection sensor for detecting wireless signals or network data, a camera/imaging sensor for gathering image data, and the like. In one embodiment, the sensors 105 may further include light sensors, tilt sensors, pressure sensors, audio sensors (e.g., microphone), or receivers for different short-range communications (e.g., Bluetooth, WiFi, etc.). In another embodiment, the sensors 105 may determine the current device context and may correlate the contextual information for application of privacy policies appropriate for a given context.

In one embodiment, through the communication network 107, the UEs 101 have connectivity to a privacy platform 109 to perform the functions associated with providing privacy policy generation based on in-game behavior data. In one embodiment, although the privacy platform 109 is depicted in FIG. 1 as a network component, it is contemplated that the privacy platform 109 may be resident within the UEs 101 as respective privacy platform modules 110a-110n (also collectively referred to as privacy platform modules 110) so that all or some of the functions of the privacy platform 103 may be performed locally at the UEs 101 by the privacy platform modules 110. Accordingly, although various embodiments are described with respect to the privacy platform 109 performing the functions and/or process for generating privacy policies based on in-game behavior data, the privacy platform modules 110 may also perform some or all of the same described function or processes.

In one embodiment, the user (and/or other parties such as a service provider) may configure the system 100 to use either the network component (e.g., the privacy platform 109), the local component (e.g., the privacy platform module 110), or the network and local components in combination to generate privacy policies. In one embodiment, the configuration of which component or components to use can be based on a user's overarching privacy settings. For example, a user's overarching privacy setting may specify that personal data should not be transmitted outside of the user's device (e.g., the UE 101), the system 100 can configure the privacy platform module 110 to perform privacy policy functions locally at the device.

In one embodiment, the privacy platform 109, for instance, monitors a user's in-game behavior while the user is playing a location-based game 103 on a UE 101 that reflects "real-life" or "real-world" locations. The privacy platform 109, for instance, performs a data mining of the user's in-game behavior to extract a user profile with respect to features such as locations visited, interaction with contacts, activities performed, etc. The privacy platform 109 then generates privacy policies based on the features extracted from the in-game behavior data. For example, the privacy platform 109 can feed the extracted features into policy templates (e.g., stored in the database 111) to generate the privacy policies.

In one embodiment, the privacy platform 109 can process the in-game behavior data to determine locations that are "sensitive" to the user. For example, the privacy platform 109 can use temporal criteria to determine which in-game locations and/or real-world locations are sensitive. In one example use case, if the user stays or visits a location greater than a threshold time duration, then the privacy platform 109 can be configured to designate that location as sensitive. It is contemplated that the privacy platform 109 can use any criterion for determining whether a location is sensitive including, for instance, a frequency of visits, user designation, crowd sourced information, etc.

In one embodiment, the in-game behavior may be requested directly from the location based game 103 (e.g., via an application programming interface (API), library, etc.), or may interact with network components associated with the game application 103. The in-game behavior data, for instance, can be stored in database 111. Examples of these network components include a services platform 113, services 115a-115n (herein after services 115), and content providers 117a-117n (herein after content providers 117).

In one embodiment, the services platform 113 may include any type of service associated with the game application 103 and/or in-game behavior data associated with a user playing the game application 103. By way of example, the services platform 113 may include social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the privacy platform 109 and the content providers 117 to supplement or aid in the processing of the content information. In another embodiment, the services platform 113 may provide the privacy platform 109 with user preference information, contextual information etc., to assist the privacy platform 109 in determining one or more privacy protecting actions for generating privacy policies based on in-game behavior data.

By way of example, services 115 may be an online service that reflects interests and/or activities of users. In one scenario, the services 115 provide representations of each user (e.g., a profile), his/her social links, and a variety of additional information. The services 115 allow users to share activities information, contextual information, and interests within their individual networks, and provides for data portability. The services 115 may additionally assist in providing the privacy platform 109 in determining sensitivity levels for one or more information exchanged over the communication session. In one embodiment, the services 115 may further assist the privacy platform 109 in profile mapping to protect the privacy interest of users. In another embodiment, the accessibility of the information exchanged by one or more services may be determined based, at least in part, on privacy policies generated based on in-game behavior data. Further, user privacy profiles may be specific to each service, for example, services 115 may deduce privacy policy settings based on user settings with similar or analogous services using the same data.

The content providers 117 may provide content to the UE 101, the game application 103, the privacy platform 109, and the services 115 of the services platform 113. The content provided may be any type of content, such as textual content, audio content, video content, image content, etc. For example, the content providers 117 may provide content that may supplement content of the game applications 103, the sensors 105, or a combination thereof. In another example, the content providers 117 may provide content that may aid the privacy platform 109 in generating privacy policies based on in-game behavior data such as providing policy templates, recommended privacy settings, crowd-sourced privacy policies, etc. In one embodiment, the content providers 117 may also store content associated with the UE 101, the privacy platform 109, and the services 115 of the services platform 113. In another embodiment, the content providers 117 may manage access to a central repository of data, and offer a consistent, standard interface to user's data.

In one embodiment, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the privacy platform 109 may be a platform with multiple interconnected components. The privacy platform 109 may include multiple servers, intelligent networking devices, computing devices, components and corresponding software for generating privacy policies based on in-game behavior data.

By way of example, the UE 101, the privacy platform 109, the game applications 103, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
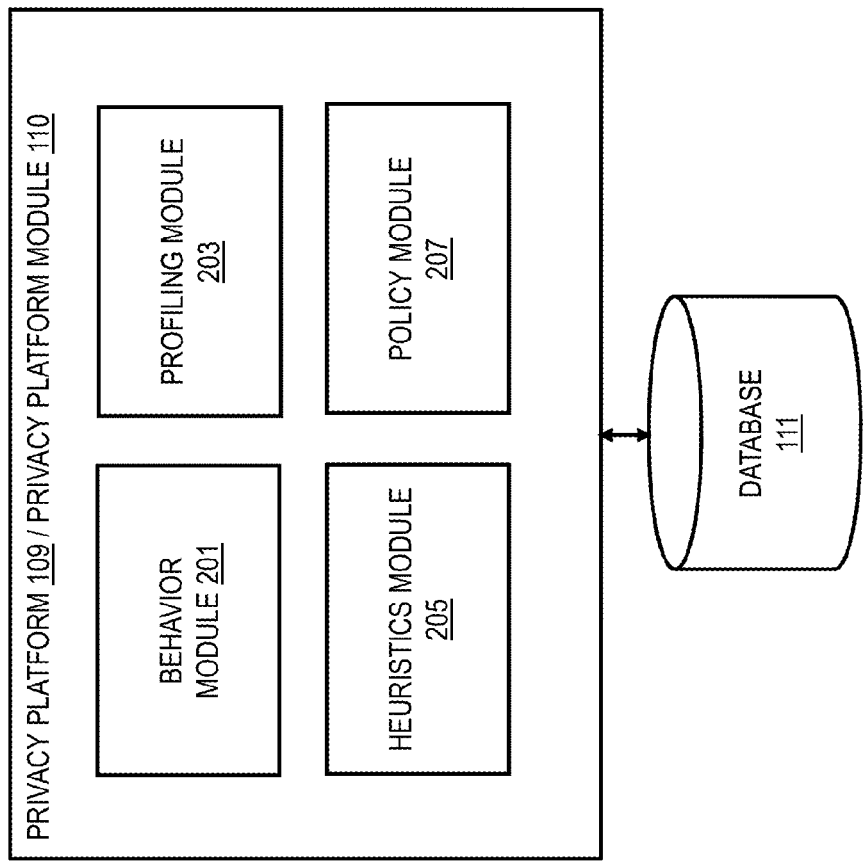
FIG. 2 is a diagram of the components of a privacy platform/privacy platform module, according to one embodiment.

FIG. 2 is a diagram of the components of the privacy platform 109 and/or the privacy platform module 110, according to one embodiment. By way of example, the privacy platform 109 and/or the privacy platform module 110 include one or more components for providing privacy policy generation based on in-game behavior data. It is contemplated that the functions of these components may be combined in one or more components or performed by other components of equivalent functionality. In this embodiment, the privacy platform 109 and/or the privacy platform module 110 include a behavior module 201, a profiling module 203, a heuristics module 205, and a policy module 207. The modules 201-207 also have connectivity to the database 111 for storing data associated with generating privacy policies based on in-game behavior data.

In one embodiment, the behavior module 201 can monitor or otherwise access user in-game behavior data generated while the user is playing a location-based game (e.g., multi-player location-based games). As previously discussed, location-based games can include applications, services, content, etc. that include as part of their game play in-game locations that are actual real-world locations or locations that can be correlated to real-world locations. For example, a location-based game may include directing users to actual physical locations as part of gameplay. In other examples, a location-based game may present a virtual representation of real-world locations that a user can visit virtually. In yet other examples, a location-based game may present a mixed environment where an in-game location can be an analogous representation of a real-world environment.

In one embodiment, the behavior module 201 monitoring any type of interaction or event associated with the user within the location-based game as in-game behavior data. For example, the in-game behavior data may include, but are not limited to, actions of interest in the game such as: (a) locations bought or visited by the user in the game; (b) types of activities performed by the user at different locations; (c) places in the game where the user likes to spend time; and (d) interaction by the user with other players in the game at specific locations and/or times within the game. By way of example, interaction data include both players with whom the user interacts, as well as those whom the user "avoids", at specific locations and/or times. In some embodiments, the interaction with other players is bilateral, in that the game action depends on choices made by both the user and the other players in question.

In one embodiment, the behavior module 201 can monitor, retrieve, store, etc. in-game behavior data in the database 111. In this example, the monitored user actions or in-game behavior data are logged in the database 111 hosted on the game terminal or device (e.g., UE 101) or a cloud-based server (e.g., services platform 113 and/or services 115).

In one embodiment, after monitoring or logging the in-game behavior data, the behavior module 201 interacts with the profiling module 203 to further process the in-game behavior data. In one embodiment, the profiling module 203 performs data mining functions on the monitored/logged in-game behavior data to extract features for generating privacy policies. Examples of such features include, but are not limited to: (1) locations l—including identifying the real-world locations that correlate or correspond to the in-game locations visited by the user in the game; (2) contact c—including categorizing the game players with whom the user interacts and the nature of the interaction (e.g., determining whether the other game players are "friends", "relatives", "colleagues", "strangers", etc. and how the user interacted with the other game players—e.g., showed an interest in interacting with them, avoided them, etc.); and (3) activity a—categorize the type of activities performed by the user in the game.

In one embodiment, the profiling module 203 aggregates the results of the classification of the features as described above to identify "sensitive" locations (e.g., locations of interest or locations otherwise associated with the user). By way of example, the identification of the sensitive locations can include identifying the type of establishment at the location based on the user contacts with whom the user interacts/avoids at that location, as well as the type of activities performed at that location. In one embodiment, the profiling module 203 can use the amount of time the user spends at a location as a parameter to determine the sensitiveness of the location, e.g., all locations in the game where the user spends time greater than a threshold t can be classified as "sensitive". The profiling module 203 can then transmit the sensitive locations to the other modules of the privacy platform 109 for further processing.

In one embodiment, the profiling module 203 can interact with the heuristics module 205 to further refine the profiling process. By way of example, the heuristics module 205 can improve the accuracy of the profiling process of the profiling module 203 by employing one or more heuristics as additional inputs to the feature extraction/classification process. These heuristics include, but are not limited to: (a) iterative/incremental classification, (b) semantic classification, (c) generalization, and (d) integration.

By way of example, to perform interactive/incremental classification, the heuristics module 205 can repeat the classification process as new in-game behavior data about a user becomes available. In one embodiment, this incremental classification can be refined to focus on user actions at specific locations (e.g., those identified as sensitive locations), with specific contacts, while performing specific activities, etc.

For semantic classification, the heuristics module 205 can use, for instance, externally available information to better characterize a user's sensitivity to specific locations. For example, the heuristics module 205 can use externally available information, e.g., with respect the type of establishments located at a specific location. In one embodiment, the heuristics module 205 can query for the externally available information from one or more network sources including, but not limited to, the content providers 117, the services platform 115, and/or the services 115. The semantic classification can also be applied to other extracted features such as contacts (e.g., to query for more information related to specific contacts to determine the sensitivity of a contact to the user), activities (e.g., to query for information related to the sensitivity of an activity to the user), and the like.

For generalization, the heuristics module 205 can generalize in-game behavior exhibited by a user at a specific location to other or all locations of the same or similar type. For instance, a user can be expected to exhibit similar behavior at other or all public parks/places, even though the user's behavior at only one specific park might have been captured in the game. In one embodiment, the heuristics module 205 can also generalize other extracted features. For example, in-game behavior with respect to one type of contact or type of activity can be generalized to other similar types of contacts and/or activities.

In one embodiment, the heuristics module 205 can use integration with other types of feedback mechanisms or data analytics to improve the accuracy of classification and feature extraction performed by the profiling module 203. For example, the heuristics module 205 can interface with or otherwise employ the results of an emotional state recognition system to determine a user's emotional response to specific locations, contacts, activities, etc. within a location-based game. The emotional response data can then be used to improve the accuracy of the "sensitive" locations (or, e.g., sensitive contacts, sensitive activities, etc.) detection process.

Based on the classification results generated by the profiling module 203 and/or the heuristics module 205, the policy module 207 then defines privacy policies applicable to real-world locations that correlate to the in-game locations indicated in a user's in-game behavior data. In one embodiment, the policy module 207 may define policies only for those locations identified as "sensitive" locations as described above. Alternatively, the policy module 207 can define policies for all identified locations or a subset of the sensitive locations.

In one embodiment, the policy module 207 generates policies that are either permissive or restrictive. In addition, in one embodiment, the policy module 207 can use policy templates in combination with the features extracted by the profiling module 203 to generate policy. However, it is contemplated that the policy module 207 can use any means for generating policies, and that the template-based approach described in the various embodiments are intended by way of illustration and not limitation.

More specifically, in one embodiment, the classification results are used to define privacy policies to regulate the user interaction I activities at identified locations in real-life (e.g., real-life or real-world locations identified as "sensitive" to a user). In one embodiment, the privacy policies can be either "permissive" or "restrictive." For example, permissive policies allow specific actions, functions, etc. to occur at associated locations, while restrictive policies restrict or prevent specific actions, functions, etc. at associated locations.

Example of policy templates used to generate permissive policies and restrictive policies are as follows:
  a. Permissive policies: At sensitive location(s) $<l_1, l_2, \ldots>$, allow
     i. user U's device d to interact with devices $<d_1, d_2, \ldots>$ of users/contacts $<c_1, c_2, \ldots>$ respectively.
     ii. apps related to activities $<a_1, a_2, \ldots>$ to execute—allowing them to
        1. access sensors $<s_1, s_2, \ldots>$ of device d required to perform activities $<a_1, a_2, \ldots>$, or
        2. share app data related to activities $<a_1, a_2, \ldots>$ with users/contacts $<c_1, c_2, \ldots>$.
  b. Restrictive policies: At sensitive location(s) $<l_1, l_2, \ldots>$, restrict/prevent
     i. user U's device d from interacting with devices $<d_1, d_2, \ldots>$ of users/contacts $<c_1, c_2, \ldots>$ respectively.
     ii. apps related to activities $<a_1, a_2, \ldots>$ from executing—preventing them from
        1. accessing sensors $<s_1, s_2, \ldots>$ of device d related to activities $<a_1, a_2, \ldots>$, or
        2. sharing app data related to activities $<a_1, a_2, \ldots>$ with users/contacts $<c_1, c_2, \ldots>$.

Accordingly, in one embodiment, the policies generation process consists of mapping the locations l, contacts c, and/or activities a (e.g., as extracted, profiled, classified, etc. by the profiling module 203) to their placeholders in the policy templates outlined above.

The above presented modules and components of the privacy platform 109 can be implemented in hardware, firmware, software, or a combination thereof. Though depicted as a separate entity in FIG. 1, it is contemplated that the privacy platform 109 may be implemented for direct operation by respective UE 101. As such, the privacy platform 109 may generate direct signal inputs by way of the operating system of the UE 101 for interacting with the game applications 103 and other applications or services executed on the UE 101. In another embodiment, one or more of the modules 201-207 may be implemented for operation by respective UEs 101, as a privacy platform 109, or combination thereof. Still further, the privacy platform 109 may be integrated for direct operation with services 115, such as in the form of a widget or applet, in accordance with an information and/or subscriber sharing arrangement. The various embodiments presented herein contemplate any and all arrangements and models.

Figure 3:
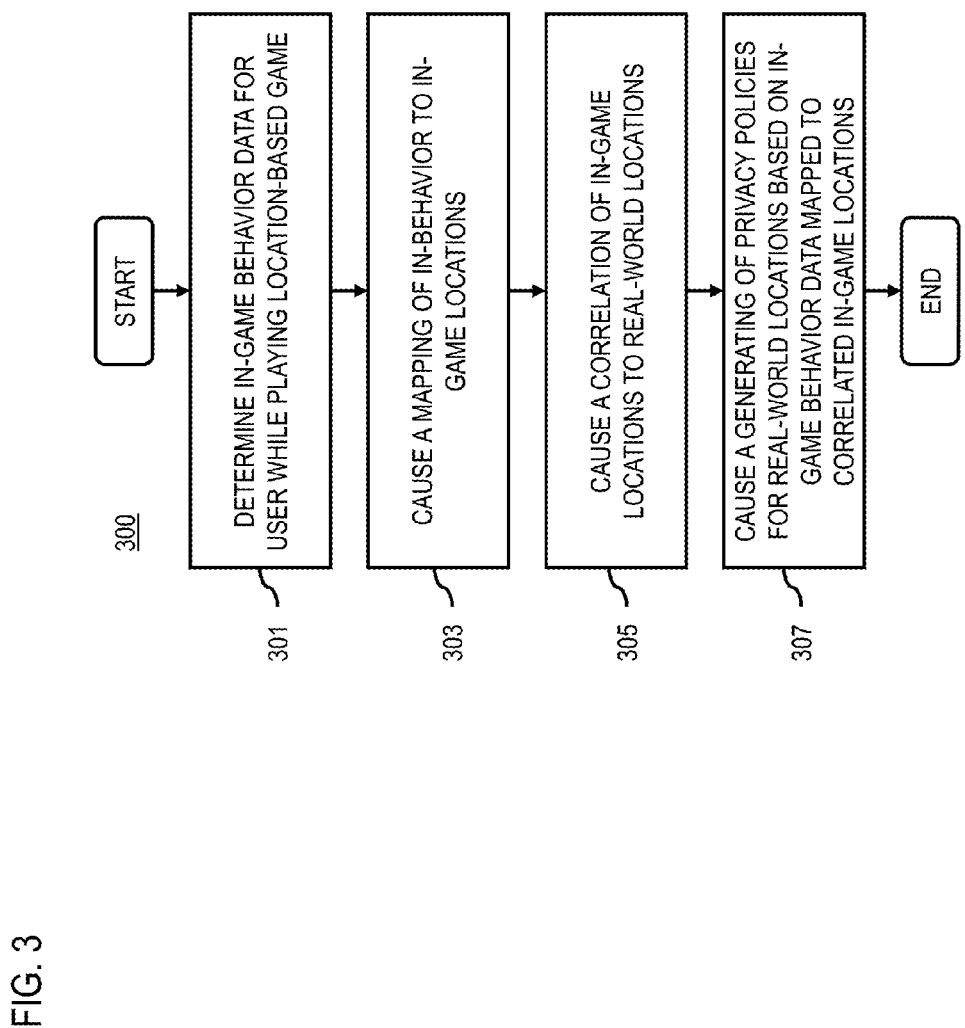
FIG. 3 is a flowchart of a process for providing privacy policy generation based on in-game behavior data, according to one embodiment.
Figure 8:
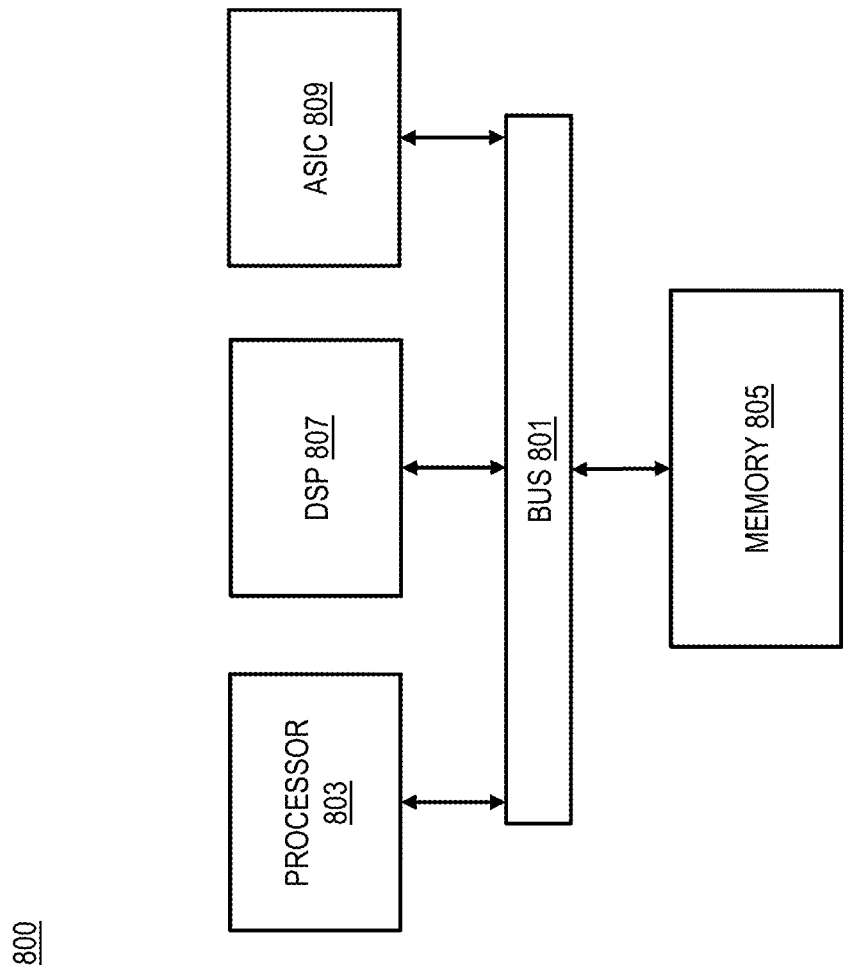
FIG. 8 is a diagram of a chip set that can be used to implement an embodiment of the invention.

FIG. 3 is a flowchart of a process for providing privacy policy generation based on in-game behavior data, according to one embodiment. In one embodiment, the privacy platform 109 performs the process 300 and is implemented in, for instance, a chip set including a processor and a memory as shown in FIG. 8. In addition or alternatively, the privacy platform module 110 may perform all or a portion of the process 300, and may also be implemented in the chip set including the processor and the memory as shown in FIG. 8.

In step 301, the privacy platform 109 determines in-game behavior data associated with at least one user while the at least one user is playing at least one location-based game. In one embodiment, the in-game behavior includes interactions, events, contextual information, and/or any other information generated by a location-based game 103 and/or the UE 101 on which the game 103 is executing. For example, in addition to the interaction tracking data available in game, the privacy platform 109 may also access contemporaneous sensor data for the sensors 105 of the device that may provide contextual information (e.g., movement, time, location, activity, other sensed nearby devices, contact information, etc.) collected during gameplay. In one embodiment, the location-based game 103 may provide application programming interfaces (APIs) to provide access to in-game data. In other examples, the game 103 may store in-game behavior data in a database (e.g., database 111) or cloud-based storage that is accessible by the privacy platform 103.

In step 303, the privacy platform 109 causes, at least in part, a mapping of the in-game behavior data to one or more game locations within the at least one location-based game. In one embodiment, the privacy platform 109 performs the mapping by classifying the data according to location. For example, the privacy platform 109 may extract location information stored in the in-game behavior data or consult contemporaneous location sensor data to determine an appropriate location (e.g., where the location-based game 103 directs a user to an actual physical location as part of gameplay). In this way, the privacy platform 109 can appropriately identify what portion of the in-game behavior was performed or collected with a particular location.

In step 305, the privacy platform 109 causes, at least in part, a correlation of the one or more game locations to one or more real-world locations. In one embodiment, to translate in-game behavior to a corresponding real-world location, the privacy platform 109 can determine what real-world locations correspond to the game locations identified in previous steps. For example, in location-based games 103 where users are directed to the actual physical locations, the in-game location has a direct correspondence to a real-world location.

In another embodiment, if the game world is based on a fictional or partly fictional map or geographical environment, the privacy platform 109 can identify features of in-game locations and match them against real-world locations that most closely match those features to find a corresponding real-world location. For example, if the user visits a fast food restaurant in in a game 103, where the in-game fast food restaurant is located within 1 mile of the user's in-game home, the privacy platform 109 can find a real-world fast food restaurant equivalent to the in-game restaurant at approximately the same distance from the user's actual home, and designate that real-world fast food restaurant as the equivalent.

In one embodiment, to make the correlation between in-game locations and real-world locations, the privacy platform can use various heuristics including, e.g., semantic classification and generalization as previously discussed. In other words, the correlation of the one or more game locations to the one or more real-world locations is based, at least in part, on a generalization of the game locations, the real-world locations, or a combination thereof. Generalization, for instance, enables the privacy platform 109 to make real-world location correlations based on determining the type or category of the in-game location (e.g., an example of this generalization is discussed in the preceding paragraph). In another embodiment, the privacy platform 109 can employ semantic classification to discover additional semantic information about an in-game location or establishments at the in-game location to facilitate finding a corresponding or correlated real-world location.

In step 307, the privacy platform 109 causes, at least in part, a generating of one or more privacy policies for the one or more real-world locations based, at least in part, on the in-game behavior data mapped to the correlated one or more game locations. As previously discussed, the process for generating privacy policies include profiling the in-game behavior data for a given location to extract or classify any number of features (e.g., location, contact, time, activity, etc.). Based on the nature of the interaction data present in the in-game behavior data (e.g., engaging in certain activities at the location, avoiding or preferring certain contacts at certain locations, etc.), the privacy platform 109 applies the extracted features to policy template (e.g., containing placeholders for the features) to generate privacy policies.

In one embodiment, the one or more privacy policies include one or more permissive policies, one or more restrictive policies, or a combination thereof; wherein the one or more permissive policies allow one or more functions of at least one device associated with the at least one user; and wherein the one or more restrictive policies restrict the one or more functions of the at least one device. By way of example, the one or more functions of the at least one device include, at least in part, one or more application functions, one or more sensor functions, one or more data sharing functions, or a combination thereof.

Figure 4:
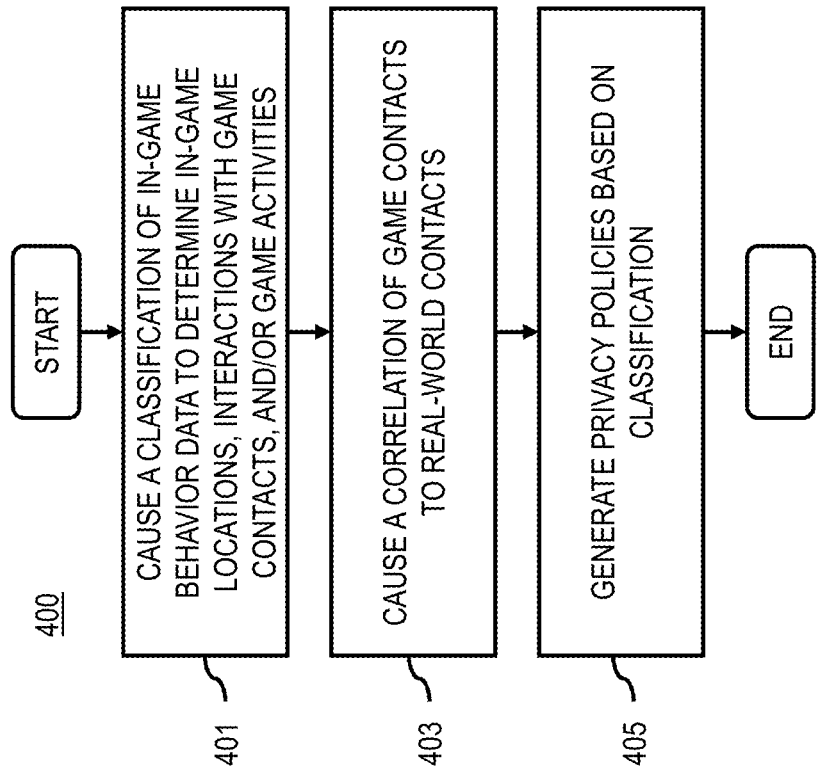
FIG. 4 is a flowchart of a process for classifying in-game behavior to generate privacy policies, according to one embodiment.

FIG. 4 is a flowchart of a process for classifying in-game behavior to generate privacy policies, according to one embodiment. In one embodiment, the privacy platform 109 performs the process 400 and is implemented in, for instance, a chip set including a processor and a memory as shown in FIG. 8. In addition or alternatively, the privacy platform module 110 may perform all or a portion of the process 400, and may also be implemented in the chip set including the processor and the memory as shown in FIG. 8. The process 400 presents optional steps for performing a feature extraction or data mining of the in-game behavior data.

In step 401, the privacy platform 109 causes, at least in part, a classification of the in-game behavior information to determine the one or more game locations, one or more game contacts, one or more interactions with the one or more game contacts, one or more game activities, or a combination thereof. It is contemplated that game locations, game contact, interactions, and/or game activities are pro- vided as examples of the features that can be extracted from in-game behavior data, and are not provided as illustrated. Accordingly, the approaches of the various embodiments described herein are applicable to any feature that can be extracted, profiled, or mined from in-game behavior and/or related data (e.g., contextual data collected on a device concurrently during gameplay).

As previously discussed, the privacy platform 109 can employ any number of heuristics to improve or otherwise facilitate the classification of the in-game behavior data. For example, in one embodiment, the classification is performed incrementally as the in-game behavior data becomes available. In one embodiment, the classification is performed using a semantic classification. In yet another embodiment, the classification integrates data available from other complementary systems (e.g., emotion recognition systems).

As an optional embodiment, the privacy platform 109 can also apply heuristics to features other than location (e.g., contacts, activities, etc.) to improve location-based privacy policies. For example, in step 403, the privacy platform 109 causes, at least in part, a correlation of the one or more game contacts to one or more real-world contacts. As with locations, if in-game contacts do not directly correlate to real-world contacts, the privacy platform 109 can extract features of in-game contacts (e.g., category or type such as friends, relatives, colleagues, strangers, etc.) and match them against real-world contacts of the user. For example, a user's behavior with respect to family in a game environment can be translated to expected behavior to family in a real-world environment. In one embodiment, the correlation of the one or more game contacts to the one or more real-world contacts is based, at least in part, on similar heuristics applied to location (e.g., semantic classification, generalization, integration, etc.).

In step 405, the privacy platform 109 generates privacy policies further based on the classification and/or the correlations to real-world contacts.

Figure 5:
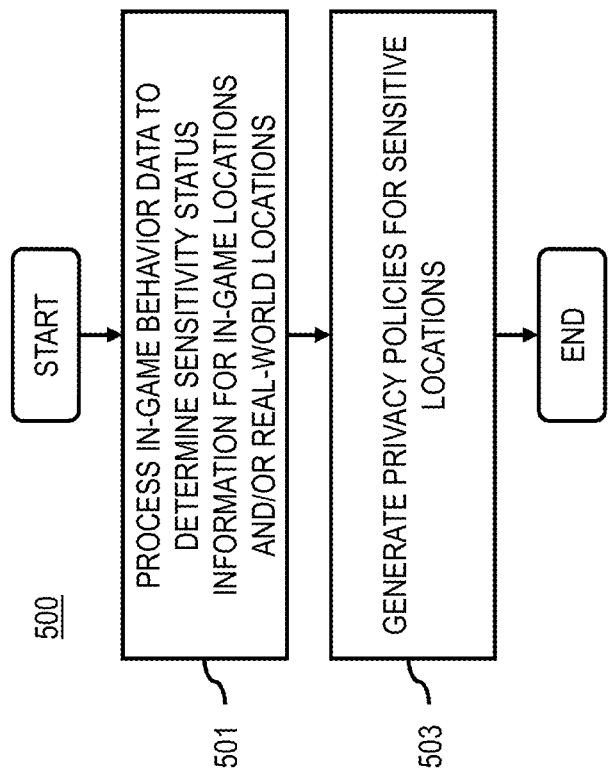
FIG. 5 is a flowchart of a process for determining sensitivity status information for locations based on in-game behavior data, according to one embodiment.

FIG. 5 is a flowchart of a process for determining sensitivity status information for locations based on in-game behavior data, according to one embodiment. In one embodiment, the privacy platform 109 performs the process 500 and is implemented in, for instance, a chip set including a processor and a memory as shown in FIG. 8. In addition or alternatively, the privacy platform module 110 may perform all or a portion of the process 400, and may also be implemented in the chip set including the processor and the memory as shown in FIG. 8. The process 500 enables the privacy platform 109 to limit the number of locations extracted from in-game behavior data for which privacy policies are needed. For example, the process 500 enables the privacy platform 109 to determine which locations are most sensitive to a user, and then generate privacy policies only for those sensitive locations or a subset of the sensitive locations.

In step 501, the privacy platform 109 processes and/or facilitates a processing of the in-game behavior data to determine sensitivity status information for the one or more game locations, the one or more real-world locations, or a combination thereof. In one embodiment, the privacy platform 109 determines sensitive locations based on a temporal parameter. For example, the privacy platform 109 determines time spent at the one or more game locations based, at least in part, on the in-game behavior data. In one embodiment, the sensitivity status information is determined based, on the time spent. For example, if the time spent at a particular location is greater than a threshold value, then the privacy platform 109 designates the location as sensitive.

As previously noted, time spent is only one example of a criterion for designating a location as sensitive. Other examples include, but are not limited to, number of visits, recommendation from others, search histories, etc.

In step 503, the privacy platform 109 generates privacy policies based on in-game behavior for the locations designated as sensitive based on their associated sensitivity status information.

Figure 6A:
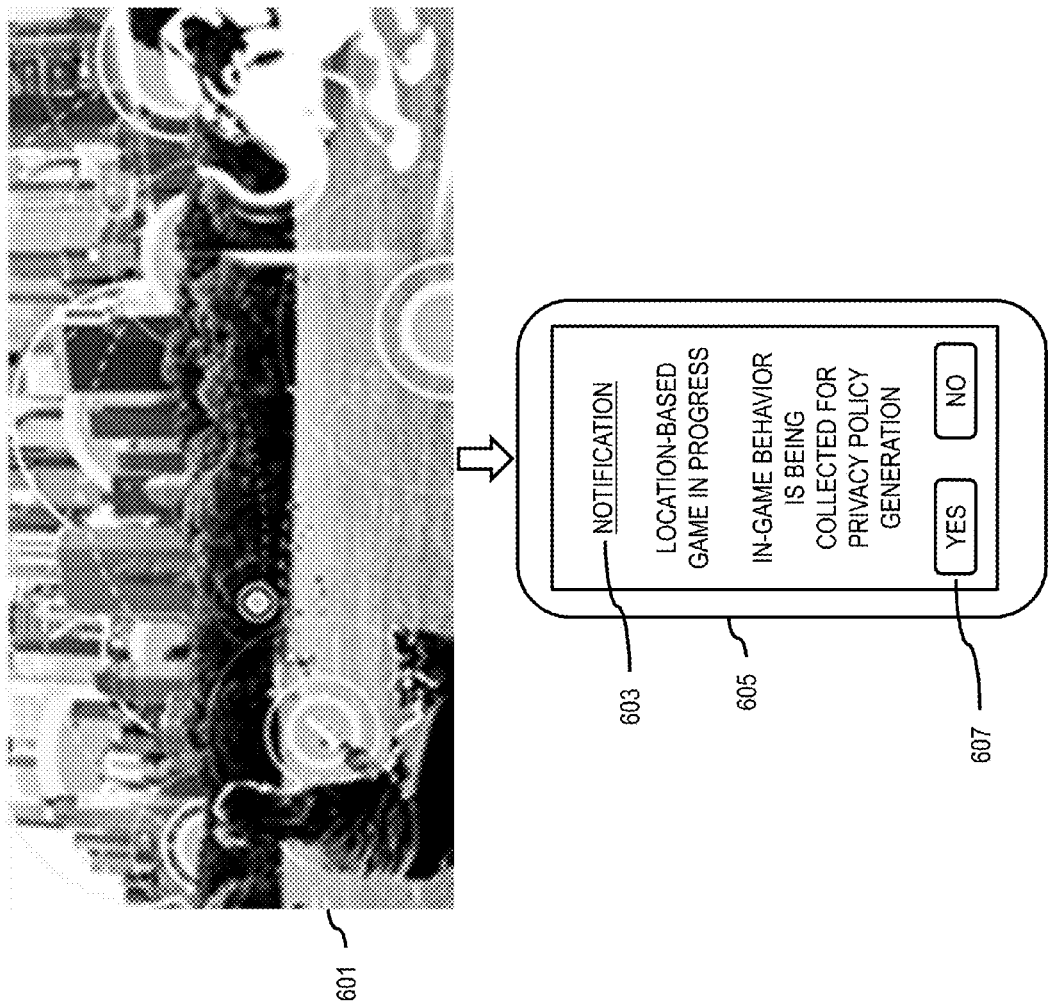
FIGS. 6A-6C are user interface diagrams depicting a process for providing privacy policy generation based on in-game behavior data, according to various example embodiments.
Figure 6C:
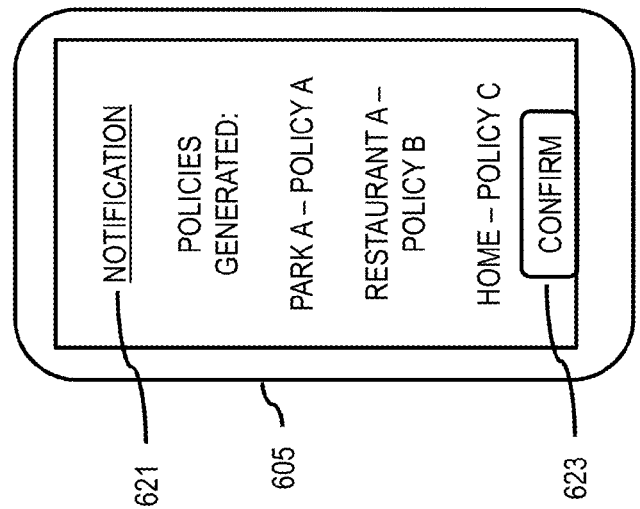
Figure 6B:
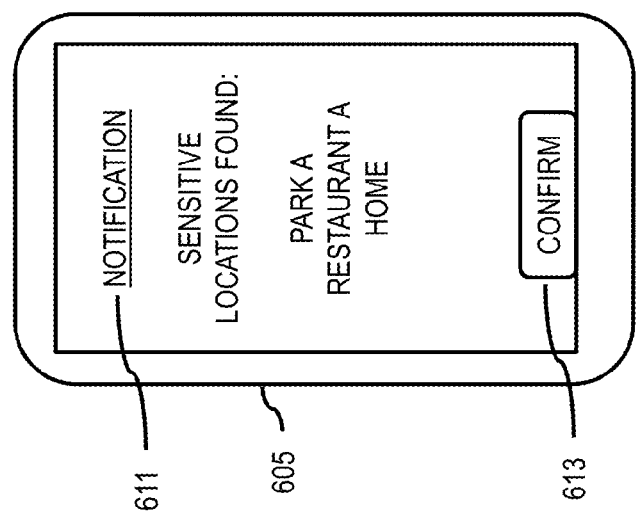

FIGS. 6A-6C are user interface diagrams depicting a process for providing privacy policy generation based on in-game behavior data, according to various example embodiments. As shown in FIG. 6A, illustration 601 depicts a scenario in which a user is playing a multi-player location-based augmented reality game that provides for augmented reality-based game play elements that are overlaid on actual physical location in the environment. In this example, the user is playing the game in a park and can see the various augmented reality elements within her local environment.

On an initiation of the location-based game, the privacy platform 109 and/or the privacy platform module 110 can present a notification 603 on the user's device 605 to let the user know that the privacy platform 109 has detected that a location-based game in in progress. The notification 603 also informs the user that the user's in-game behavior data is being collected to facilitate privacy policy generation. The notification 603 also provides options 607 for the user to agree to the in-game behavior monitoring. If the user agrees by selecting the YES button of the options 607, the privacy platform 109 and/or the privacy platform module 110 begins monitoring the user's in-game behavior to initiate the privacy policy generation process.

Once sufficient data is collected, the privacy platform 109 and/or the privacy platform module 110 processes the in-game behavior data to determine locations that are sensitive to the user. In this example, the user has spent a greater than then threshold amount of time at the Park A, Restaurant A, and Home. As shown in FIG. 6B, the privacy platform 109 and/or the privacy platform module 110 presents a notification 611 on the user's device 605 to indicate that sensitive locations have been found and lists the sensitive locations for the user. In one embodiment, the privacy platform 109 and/or the privacy platform module 110 can also present an option 613 for the user to confirm or edit the sensitive locations.

Once the user confirms the locations, the privacy platform 109 and/or the privacy platform module 110 processes the in-game behavior data (e.g., by extracting locations, contacts, activities, interactions, etc.) associated with those locations to automatically generate location-based privacy policies for users at that location. As shown in FIG. 6C, the privacy platform 109 and/or the privacy platform module 110 can present a notification 621 that privacy policies have been generated for the sensitive locations confirmed by the user. In this case, Park A is associated with a Policy A, Restaurant A is associated with a Policy B, and Home is associated with a Policy C. By way of example, the policies are specifically tailored or customized for each location based on the user's in-game behavior. The privacy platform 109 and/or the privacy platform module 110 also presents the user with an option 623 to confirm or edit the policies.

Accordingly, by automatically generating the privacy policies for the user based on the user's in-game behavior data, the privacy platform 109 and/or the privacy platform module 110 advantageously avoids the user's having to manually specify a policy for each location of potential interest. By reducing the burden, the privacy platform 109 and/or the privacy platform module 110 also advantageously enables the user to implement customized policies which enable or restrict device functions as appropriate without resorting to an "All-or-Nothing" approach.

The processes described herein for providing privacy policy generation based on in-game behavior data may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
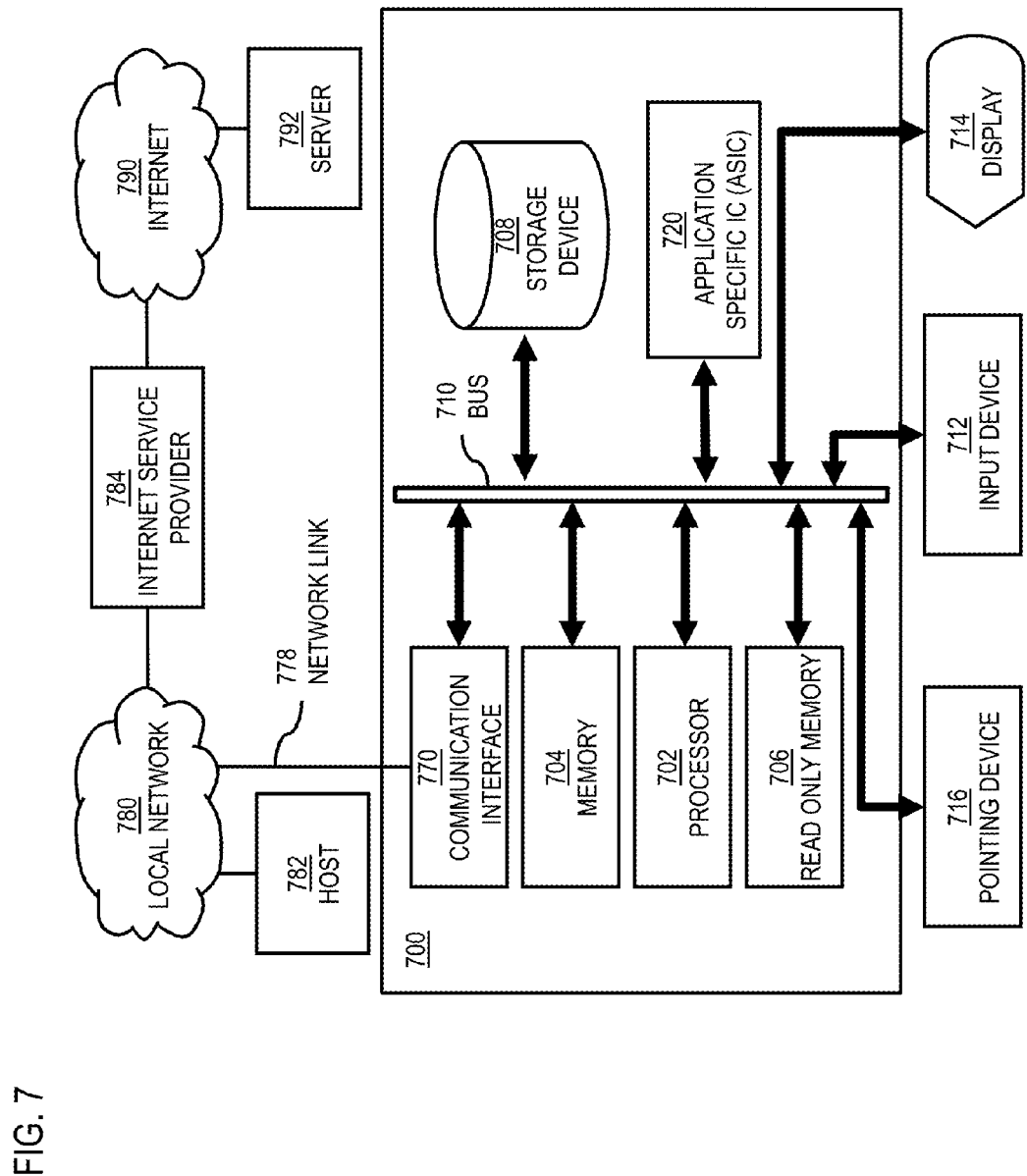
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide privacy policy generation based on in-game behavior data as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing privacy policy generation based on in-game behavior data.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing privacy policy generation based on in-game behavior data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing privacy policy generation based on in-game behavior data. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing privacy policy generation based on in-game behavior data, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 107 for providing privacy policy generation based on in-game behavior data to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide privacy policy generation based on in-game behavior data as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing privacy policy generation based on in-game behavior data.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide privacy policy generation based on in-game behavior data. The memory 805 also stores the data associated with or generated by the execution of the inventive steps.

Figure 9:
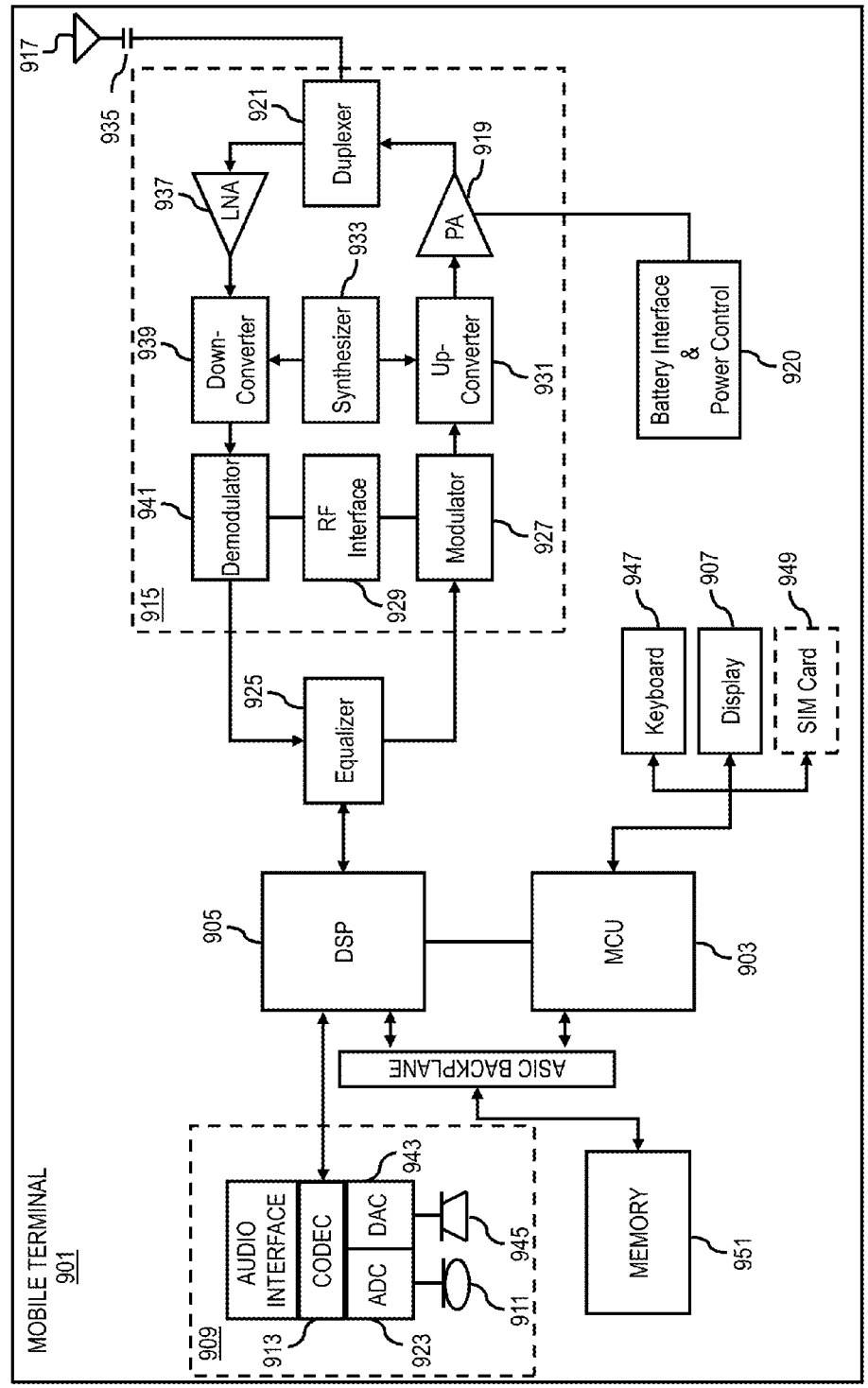
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing privacy policy generation based on in-game behavior data. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing privacy policy generation based on in-game behavior data. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide privacy policy generation based on in-game behavior data. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by at least one processor, in-game behavior data associated with user information restricted by at least one user with respect to other users at at least one in-game location while the at least one user is playing at least one location-based game, wherein the at least one location-based game models the at least one in-game location based on an equivalent real-world location, and the location-based game directs the at least one user to visit the equivalent real-world location when playing the location-based game;
   causing, at least in part by the at least one processor, a mapping of the in-game behavior data that occurs at the at least one in-game location within the at least one location-based game to the equivalent real-world location; and
   causing, at least in part by the at least one processor, a generation of one or more privacy policies based, at least in part, on the in-game behavior data, wherein the one or more privacy policies permit and restrict access to the user information via at least one device of the at least one user by another user when the at least one device is detected as located at the equivalent real-world location based on sensor data from the at least one device, wherein the user information includes one or more interests, one or more activities, one or more social links, or a combination thereof of the at least one user.

2. A method of claim 1, further comprising:
   causing, at least in part, a classification of the in-game behavior data to determine the at least one in-game location, one or more game contacts, one or more interactions with the one or more game contacts, one or more game activities, or a combination thereof, wherein the one or more game contacts include the another user,
   wherein the one or more privacy policies are further based, at least in part, on the classification, and
   wherein the user information is collected via one or more user interfaces of the at least one device, detected via one or more sensors of the at least one device, or a combination thereof.

3. A method of claim 2, further comprising:
   causing, at least in part, a correlation of the one or more game contacts to one or more real-world contacts of the at least one user,
   wherein the one or more privacy policies are further generated with respect to access to the user information by the one or more real-world contacts, and
   wherein the location-based game presents on the at least one device a virtual representation of the equivalent real-world location for the at least one user to virtually visit when playing the location-based game.

4. A method of claim 2, wherein the classification is performed incrementally as the in-game behavior data becomes available, and wherein the equivalent real-world location is a real-world location where the at least one user is currently located, and the location-based game augments one or more play elements onto a camera view of the real-world location on the at least one device.

5. A method of claim 2, wherein the classification is performed using a semantic classification, and wherein the location-based game presents a mixed reality image of the equivalent real-world location that is an analogous representation of a real-world location where the at least one user is currently located.

6. A method of claim 1, further comprising:
   causing, at least in part, a generalization of the at least one in-game location as a point of interest category,
   wherein the correlation of the at least one in-game location to the equivalent real-world location is based, at least in part, on the generalization,
   wherein the one or more privacy policies are further generated with respect to access to the user information by one or more applications on the at least one device, and
   wherein the equivalent real-world location is a real-world location away from a real-world home of the at least one user at a distance approximately identical with a distance between the at least one in-game location and an in-game home of the at least one user.

7. A method of claim 1, further comprising:
   processing the in-game behavior data to determine sensitivity status information of the at least one in-game location, the equivalent real-world location, or a combination thereof for the at least one user.

8. A method of claim 7, further comprising:
   determining time spent at the at least one in-game location based, at least in part, on the in-game behavior data,
   wherein the sensitivity status information is based, at least in part, on the time spent.

9. A method of claim 1, wherein the one or more privacy policies include one or more permissive policies and one or more restrictive policies, wherein the one or more permissive policies allow access to one or more functions of the at least one device associated with the another user, and wherein the one or more restrictive policies restrict access to the one or more functions of the at least one device associated with the another user.

10. A method of claim 9, wherein the one or more functions of the at least one device include, at least in part, one or more application functions, one or more sensor functions, one or more device pairing functions, or a combination thereof.

11. An apparatus comprising:
at least one processor; and
at least one memory including computer program code for one or more programs,
the at least one memory and the computer program code configured to, with the at least one processor, cause the apparatus to perform at least the following,
determine in-game behavior data associated with user information restricted by at least one user with respect to other users at at least one in-game location while the at least one user is playing at least one location-based game, wherein the at least one location-based game models the at least one in-game location based on an equivalent real-world location, and the location-based game directs the at least one user to visit the equivalent real-world location when playing the location-based game;
cause, at least in part, a mapping of the in-game behavior data that occurs at the at least one in-game location within the at least one location-based game to the equivalent real-world location; and
cause, at least in part, a generation of one or more privacy policies based, at least in part, on the in-game behavior data, wherein the one or more privacy policies permit and restrict access to the user information via at least one device of the at least one user by another user when the at least one device is detected as located at the equivalent real-world location based on sensor data from the at least one device, wherein the user information includes one or more interests, one or more activities, one or more social links, or a combination thereof of the at least one user.

12. An apparatus of claim 11, wherein the apparatus is further caused to:
cause, at least in part, a classification of the in-game behavior data to determine the at least one in-game location, one or more game contacts, one or more interactions with the one or more game contacts, one or more game activities, or a combination thereof, wherein the one or more game contacts include the another user,
wherein the one or more privacy policies are further based, at least in part, on the classification, and
wherein the user information is collected via one or more user interfaces of the at least one device, detected via one or more sensors of the at least one device, or a combination thereof.

13. An apparatus of claim 12, wherein the apparatus is further caused to:
cause, at least in part, a correlation of the one or more game contacts to one or more real-world contacts of the at least one user,
wherein the one or more privacy policies are further generated with respect to access to the user information by the one or more real-world contacts.

14. An apparatus of claim 12, wherein the classification is performed incrementally as the in-game behavior data becomes available, performed using a semantic classification, or a combination thereof.

15. An apparatus of claim 11, wherein the apparatus is further caused to:

cause, at least in part, a generalization of the at least one in-game location as a point of interest category,
wherein the correlation of the at least one in-game location to the equivalent real-world location is based, at least in part, on the generalization, and
wherein the one or more privacy policies are further generated with respect to access to the user information by one or more applications on the at least one device.

16. An apparatus of claim 11, wherein the apparatus is further caused to:
process the in-game behavior data to determine sensitivity status information of the at least one in-game location, the equivalent real-world location, or a combination thereof for the at least one user.

17. A non-transitory computer-readable storage medium carrying one or more sequences of one or more instructions which, when executed by one or more processors, cause an apparatus to perform:
determining in-game behavior data associated with user information restricted by at least one user with respect to other users at at least one in-game location while the at least one user is playing at least one location-based game, wherein the at least one location-based game models the at least one in-game location based on an equivalent real-world location, and the location-based game directs the at least one user to visit the equivalent real-world location when playing the location-based game;
causing, at least in part, a mapping of the in-game behavior data that occurs at the at least one in-game location within the at least one location-based game to the equivalent real-world location; and
causing, at least in part, a generation of one or more privacy policies based, at least in part, on the in-game behavior data, wherein the one or more privacy policies permit and restrict access to the user information via at least one device of the at least one user by another user when the at least one device is detected as located at the equivalent real-world location based on sensor data from the at least one device, wherein the user information includes one or more interests, one or more activities, one or more social links, or a combination thereof of the at least one user.

18. A non-transitory computer-readable storage medium of claim 17, wherein the apparatus is further caused to perform:
causing, at least in part, a classification of the in-game behavior data to determine the at least one in-game location, one or more game contacts, one or more interactions with the one or more game contacts, one or more game activities, or a combination thereof, wherein the one or more game contacts include the another user,
wherein the one or more privacy policies are further based, at least in part, on the classification, and
wherein the user information is collected via one or more user interfaces of the at least one device, detected via one or more sensors of the at least one device, or a combination thereof.

19. A non-transitory computer-readable storage medium of claim 18, wherein the apparatus is further caused to perform:
causing, at least in part, a correlation of the one or more game contacts to one or more real-world contacts of the at least one user, wherein the one or more privacy policies are further generated with respect to access to the user information by the one or more real-world contacts.

20. A non-transitory computer-readable storage medium of claim 17, wherein the apparatus is further caused to perform:

processing the in-game behavior data to determine sensitivity status information of the at least one in-game location, the equivalent real-world location, or a combination thereof for the at least one user.

\* \* \* \* \*